Jan. 26, 1943.　　　A. R. BLACK　　　2,309,233
SUB-IRRIGATION SYSTEM
Filed Nov. 28, 1938　　　2 Sheets-Sheet 2
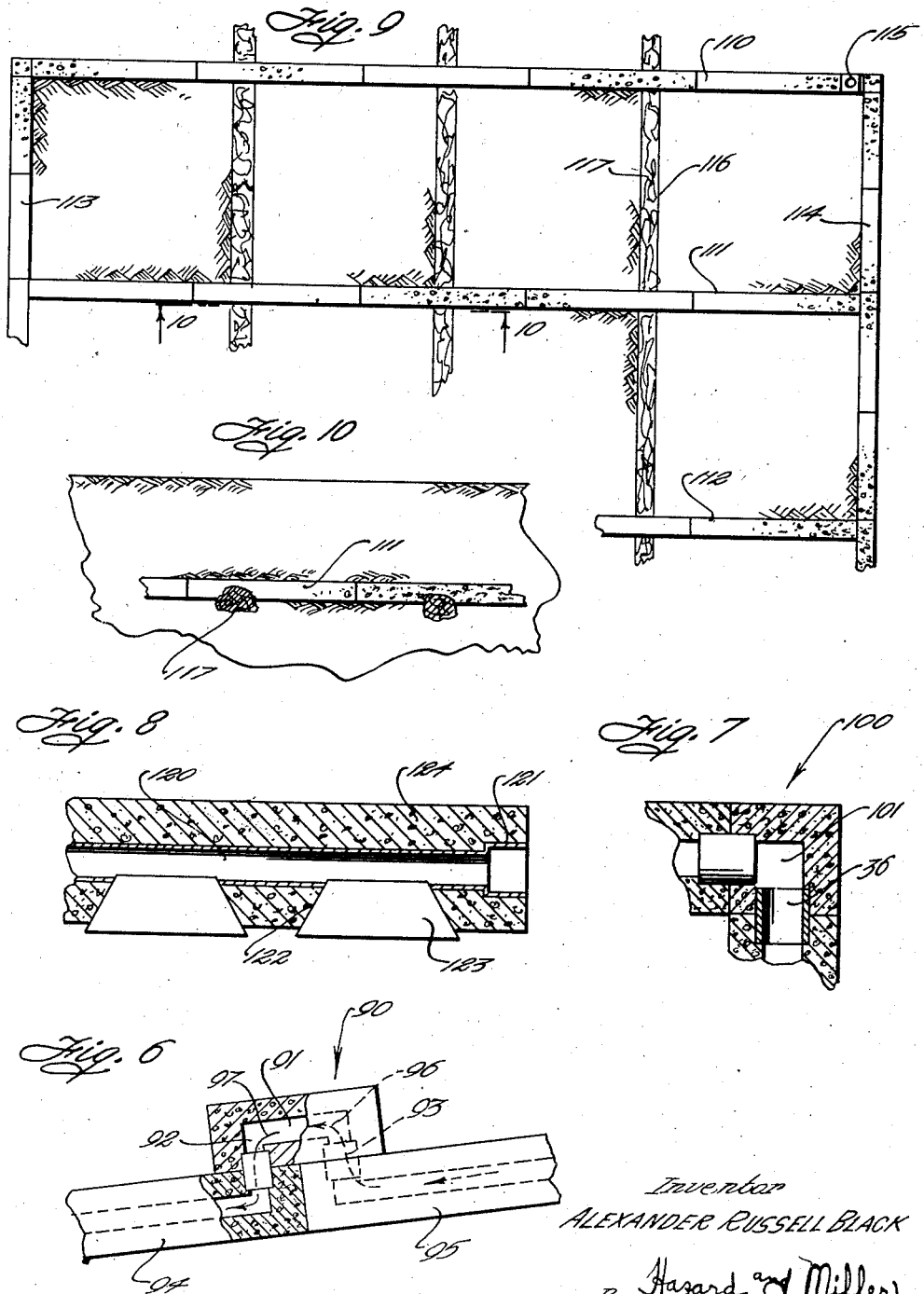
Inventor
ALEXANDER RUSSELL BLACK
By Hazard and Miller
Attorneys Patented Jan. 26, 1943

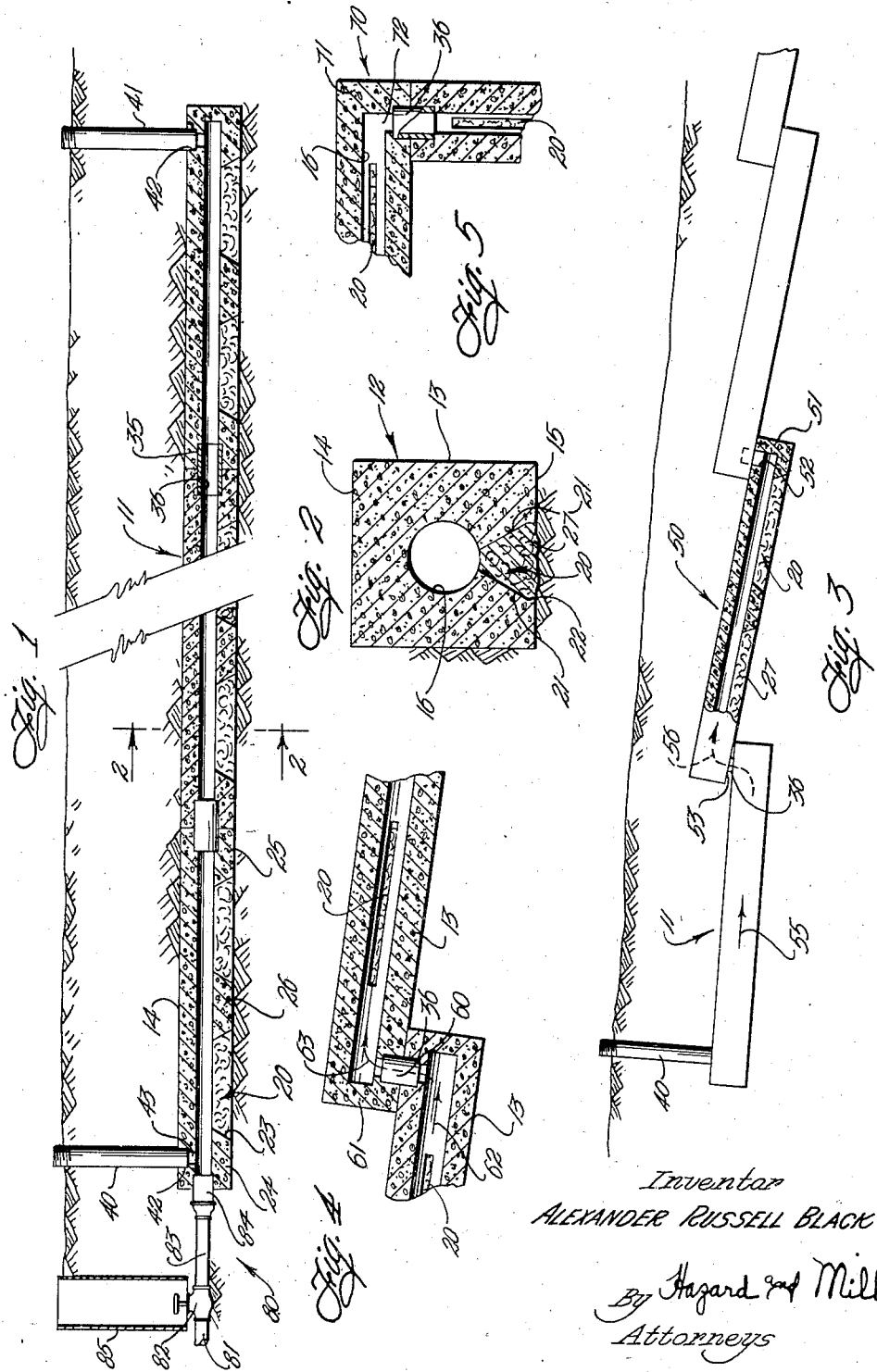

2,309,233

UNITED STATES PATENT OFFICE 2,309,233

SUBIRRIGATION SYSTEM

Alexander Russell Black, Gardena, Calif.

Application November 28, 1938, Serial No. 242,761

1 Claim. (Cl. 61—13)

My invention relates to a sub-irrigation system and relates to the equipment and the method of underground charging and drainage of water. My present invention may be considered as a further development of the sub-irrigation system of my Patent No. 2,052,020, patented August 25, 1936.

An object and feature and characteristic of my present invention relates to the employment of concrete conduits or conduits made of similar materials or molded hollow structures. A further characteristic of my invention provides for connecting the individual conduits, for instance end to end by means of nipples or interfitting spigots. Thus by a simple construction of having for instance concrete or similar conduits with cylindrical spigots connecting each conduit end to end, I may develop a considerable length of underground irrigation, piping or conduits.

A further object and feature of my invention is constructing the conduits so that they may be connected with the spigots or nipples at right angles to the axis of each conduit bore, thus the conduits may be connected by a vertical spigot at each end necessitating an upward flow of the water in passing from one conduit section to another. In this manner of connecting the pipe the spigots have a connection through the top of one pipe adjacent its end to the underside of an adjacent pipe in which case the pipes are closed at their ends. Another type of connection involves the lateral displacement of adjacent conduits with a horizontal connection of the spigots. In this case the pipes are overlapped, each being closed at its end. A further feature is in making a right angular angle turn by providing one conduit with a spigot leading off the side adjacent one end and an adjacent conduit pipe being connected to the end of the spigot.

A further characteristic of my invention is in making the conduits substantially square in cross section except for the central duct which is cylindrical, providing annular recesses for the reciprocation of the spigots or nipples, these latter being preferably made from redwood, using the heart of the wood which is very resistant to rot and decay.

A further and an important characteristic of my invention is forming the outlet from each conduit pipe at the bottom, this being done preferably by forming elongated tapering grooves connecting from the bottom of each pipe section to the cylindrical bore, thus grooves are wedge shaped with the small end of the wedge uppermost. These wedge shaped grooves are then packed with moisture absorbent material such as peat moss and allowing a retarded seepage of water from the conduit but prevent entrance of roots and the like of plants. A further characteristic feature of my invention is the control of the water level or water table in the soil by the use of standpipes at the ends of the runs of underground conduits as by the heighth of water in these standpipes, the heighth of the water table in the soil may be determined. For most types of agricultural sub-irrigation it is desirable to maintain the surface of the ground relatively dry and provide the moisture for the growing crop suitable distances below the surface, depending upon the depth of root structure of the particular plants.

My invention also comprehends the method and the apparatus for developing an air circulation to the soil under the ground surface. The soil is frequently spoken of as having an underground atmosphere. Sometimes these are gases which are deleterious to crops and at other times there is insufficient oxygen and nitrogen, but by my system of air circulation, the air disseminates into the soil at the desired depth below the ground level and thus introduces nitrogen directly into the soil where it can be acted upon by the soil bacteria and changed from an inert gas into a plant food. The oxygen is also beneficial to the soil. In this function of the air treatment of the soil, the provision of the standpipes which after the irrigation procedure by water are left open for the circulation of air, as the water recedes air is drawn down into and through the conduits and moreover the natural winds blowing over the ground surface develop an air circulation through the irrigation conduits.

A further feature of my invention is that it allows the use of so-called green manure mixed with the earth instead of requiring the use of a thoroughly decomposed manure. By my system of sub-irrigation the green or that is, undecomposed manure is mixed with the earth to form a bed for plants. The sub-irrigation moistens this manure, causing a decomposition and fermentation with the development of heat. There are certain gases produced which are apparently carried away by the irrigation pipe. As it is known that the root system of plants must in effect breathe, this carrying away of these noxious gases prevents asphyxiation of the root system of the plants and therefore prevents the so-called burning up of plants by green manure when it decomposes. An advantage of this procedure is that the decomposition of the green manure takes place while it is being used by the plant and therefore all of the fertilizing value is utilized in the soil whereas where a compost is made of such green manure and this is left until it decomposes, a great deal of the ammonia disappears as a gas into the atmosphere and its fertilizing value is hence lost.

My invention also comprehends an irrigation lay-out using the concrete or similar conduits with the discharge slots for the water arranged in somewhat parallel lines with a zig-zag path crisscrossing the area to be irrigated together with connecting trenches with absorbent material such as peat moss buried in the ground and intersecting the rows of conduits. This embedded peat moss causes a more even distribution of the water and also as the moss dries, provides for air circulation.

Various detail features of my invention include connecting double elbows used to retard the flow of water on a down-grade in irrigation. A modified manner of making the conduits is to use as a core thin galvanized iron pipe preferably made of sheet material with the enlarged recesses for the spigots at the end. Each pipe is provided with a series of slots, wood mold forms are placed therein and mold the outlet slots or discharge openings when the concrete is molded around the pipes.

My invention is illustrated in connection with the accompanying drawings, in which:

Fig. 1 may be considered as a vertical section through an installation of one form of my underground irrigation piping system, this illustrating the standpipes at the end of a complete run or underground length of piping and showing the spigot or nipple joints end to end. This figure is broken representing omitted sections which may include any of the couplings shown in the subsequent figures.

Fig. 2 is a vertical transverse section on the line 2—2 of Fig. 1 in the direction of the arrows illustrating a typical outlet with the fibrous packing.

Fig. 3 is a side elevation partly broken away to show another manner of installing my invention, particularly adapted on sloping grounds to retard the waste downward flow of water by gravity, the standpipe at one end being shown and that at the opposite end being omitted. This illustrates the spigot or nipple connections between bottom and top of adjacent pipe conduits.

Fig. 4 is a detail horizontal section showing another type of spigot or nipple joint, this being between adjacent sides of two conduits.

Fig. 5 is a horizontal section showing a corner detail in which a spigot or nipple connection at the side of one pipe connects into the end of the connecting pipe.

Fig. 6 is a longitudinal elevation partly broken away showing the use of a double elbow to retard the flow of water in a conduit conforming to the slope of the ground.

Fig. 7 is a section illustrating a right angle elbow connecting the two series of conduits.

Fig. 8 is a longitudinal section of a modification illustrating the use of a thin sheet metal pipe as the interior mold, this forming a permanent part of the conduit.

Fig. 9 is a plan of a section of an area to be irrigated indicating the use of the concrete conduits and interconnecting filled trenches with peat moss at the bottom.

Fig. 10 is a section on the line 10—10 of Fig. 9 in the direction of the arrows.

In my invention I make a series of concrete pipe sections which may be considered as to the main sections as designated by the numeral 11. For sake of simplicity these are preferably of molded concrete being prepared in forms, making a square cross sectional structure 12 which may be considered as having opposite sides 13, a top 14 and a bottom 15. Each pipe section has a central opening 16 and preferably a hollow cylinder and extending from end to end. This is molded by a mandrel in the elongated concrete block and removed before the concrete hardens. On the underside of each block or pipe length there are wedge shaped discharge openings 20. These are characterized by opposite sloping side walls 21 which converge towards the center, that is, to the water duct 16. Instead of molding these openings in place by a withdrawable molding form, I prefer to cut the concrete out of the bottom while it is still slightly damp and before it is hardened and then trowel the bottom surface so as to form an inwardly turned fin 22 on the lower end of each of the sides 21 and on a line with the bottom 15. The ends of each of the openings 20 are preferably sloped slightly as indicated at 23, note Fig. 1 and for instance in a four foot length of pipe I prefer to make these wedge shaped slots or openings about eighteen inches in length, that is, there are two of these openings spaced from the end of the individual pipe by the end spacing concrete 24 and 25 and by the center spacing section 26. These slots or discharge openings after the concrete has cured are filled and packed with a water absorbent material 27 of which I prefer to use peat moss of good quality. Such moss is dampened and pressed in place, then when it dries it is held tightly in the slots and the pipe sections may be handled without this packing becoming loosened, especially as the inturned fins 22 are operative to retain the packing in place. One of the reasons for using peat moss is that apparently it does not deteriorate under the ground or is subject to wetting and drying. It does not form a humus in the soil. When saturated it allows the passage or percolating of water and is also operative to prevent roots of plants entering the pipe.

A typical connection of the various pipe lengths includes an enlarged socket end 35 adjacent the end of the pipe lengths which are connected end to end. These sockets are of sufficient diameter and cylindrical to receive a cylindrical nipple or spigot designated 36. I prefer to make these spigots of the heart of redwood turned cylindrical on the outside and with a cylindrical bore. These can readily be fitted in place, when dampened they expand sufficiently to form a tight joint and yet are resistant to rot. These may be inserted either on the job while an installation is being put in or a nipple may be fitted in the end of one pipe section at the plant where the sections are made.

In the installation of Fig. 1 I employ two standpipes 40 and 41 which lead downwardly through the ground to reception sockets 42 on the upper side of the pipe sections and below these sockets there are openings 43 communicating with the water duct 16. The end pipe preferably has a closed end. When irrigating water may be charged into the opposite and upper end it flows lengthwise of the system, the underground conduits being placed to have the desired gradual slope so that the water flows by gravity. Presuming the system has been quite dry in starting underground irrigation, the water saturates the dry peat moss packing at the discharge slots in the bottom and then flows outwardly through such slots and at the bottom of the conduits, these have been placed in a trench in the ordinary manner of underground irrigation. The water spreads both laterally and downwardly from the section of conduits and due to capillary action rises towards the surface. The rate of irrigation may readily be gauged by having the water rise in the remote standpipe such as 41 illustrated in Fig. 1. If this water is not allowed to overflow it will indicate that all of the water entering at the standpipe 40 is being distributed into the ground and when this becomes saturated the water will flow out of the standpipe 41, thus showing that the irrigation should be discontinued.

An important function of the standpipes and of these hollow pipes made of somewhat porous material and together with the discharge slots is that they positively establish a distribution of air into the soil. For instance the irrigating water may be aerated by a simple and well known means so that a good deal of air is carried into the soil by the water, or again, when the irrigation is discontinued air follows the water into the soil, this air entering through the standpipes and being distributed through the hollow ducts and immerging through the porous concrete and also through the discharge slots 20. Moreover, when the system is left for a relatively long period of time without irrigation, the natural winds blowing over the ground surface cause a circulation of air in the underground system, a certain portion of which is carried into the soil, thus modifying the so-called underground atmosphere. The entrance of air into the soil adjacent the roots of growing plants has a beneficial effect, the nitrogen of the air is acted upon by certain soil bacteria and changed from an inert gas into a soluble plant food. The oxygen of the air is also beneficial.

Certain of the detail features used in the whole general system involve connections such as shown in Fig. 3. For instance in this case each of the conduit sections 50 is shown as having closed ends 51. At one end the spigot openings 52 are in the top and for the adjacent pipe the spigot opening is in the bottom indicated at 53, these being connected by the wood spigots or nipples 36. Thus in this case and presuming the ground level has quite a decided slope and it is desired to maintain the irrigation piping at substantially a constant distance below the cultivated surface, the system may be installed as shown in Fig. 3 in which the flow of the water is in the direction of the arrow 55 in the first pipe from the standpipe 40. Therefore at the end of the first pipe the water after filling the first pipe flows upwardly as indicated by the arrow 56 and enters a second pipe section. Each of these sections has a similar type of discharge slots. Therefore continuing from pipe to pipe, the water must rise upwardly before it can flow down an adjacent pipe section, this therefore retarding the downward flow by gravity and facilitating securing an even irrigation as to the amount of water from the high to the low parts of a tract of land.

In the construction of Fig. 4 the two adjacent pipes are connected side to side. In this case there are the spigot connections 60 in adjacent sides of contiguous pipe ends, such pipe ends having end closures 61. The spigots 36 are then fitted in these spigot sockets. This type of construction requires the flow of water for instance longitudinally as indicated by the arrow 62 to develop two right angular turns as indicated at 63. This produces a retarding of the flow of water and a slightly greater lateral distribution.

As it is often necessary to make right angular turns, an elbow connection is indicated in Fig. 5 designated by the numeral 70. Thus one pipe section has an end closure 71 of the duct 16 with a right angular offset duct 72, the spigot 36 being fitted in this side opening and connected to the end of an adjacent conduit section. It will be seen therefore that by making the pipe sections square in cross section and with transverse ends I have developed a number of different types of conduit connections which may be used in the same or different irrigation installations. Manifestly the person installing an irrigation system will choose the type of connections between individual ducts best suited for the purpose.

My sub-irrigation system may also be used for unwatering soil, that is, for drainage, such water entering through the slots 20 and fibrous packing 27 which restricts the inflow of silt. The water naturally flows to the lowest part of the system and may be drained off through a lower standpipe or drain.

The air circulation through the irrigation system between water applications is instrumental in preventing the entrance of roots of plants into the ducts. It is authoritively known that root systems do not penetrate into the air. As there is normally an air draft or wind on the ground surface, this causes a ventilation through the standpipes.

Instead of providing the supply water in for instance the standpipe 40, it is frequently desirable to have a pipe connection with a valve to the water supply main. Such connection is designated by the numeral 80 and includes the supply main 81 a valve 82 and a connecting pipe 83 to an end spigot 84. A casing 85 leading from the surface of the ground to the valve retains the soil in position and provides for readily operating the valve by a wrench extending through the casing from the ground level. When using this construction of a valve and water feed, the level of the water in the ground may be approximately determined as to its water table by the heighth of water in the standpipe 40 and 41, the water in the pipes usually being slightly above the water level in the ground and as a rule the water does not rise in the standpipes until the ground is saturated. The heighth of water in the standpipes may readily be determined by a float gauge. Incidentally when my irrigation system is installed in lawns, I generally provide lead-off conduits with the standpipes hidden in shrubbery or some inconspicuous place contiguous to the lawn.

In Fig. 6 I illustrate the employment of a double elbow to retard the flow of water in a manner described in connection with Fig. 3. Such double elbow is designated by the numeral 90. It is preferably formed of concrete with a longitudinal duct 91 and two right angular connecting end ducts 92. These connect by spigots 93 to upwardly directed ends of the ducts of the adjacent conduit pipes 94 and 95. In the illustration the slope is intended to indicate the slope of the ground. Therefore when the water flows downwardly in the direction of the arrow 96 when the ground is sufficiently saturated, it flows through the double elbow in the direction of the arrows 96, 97, continuing the down grade. This construction develops an even distribution of water to the proper saturation of the soil even in quite steeply sloping ground where the conduit as a whole is on a decided downward inclination.

I find it convenient when joining two lines of conduits at right angles to employ the single elbow 100 of Fig. 7. This is made as a rectangular or substantially square block with a cored-out central space 101 which connects by the spigots 36 to the adjacent pipe sections. With this construction all of the conduits may be made the same and eliminates the right angular end connection shown in Fig. 5.

In Figs. 9 and 10 I illustrate a combination conduit and entrenched peat moss for an even distribution of the water and presuming the area to be irrigated is substantially rectangular, I employ a length of conduit pipes 110 and parallel thereto there are other rows 111 and 112. At each end of the irrigated area these are connected by lateral conduits 113 and 114. The upper standpipe is designated at 115. The water therefore follows the pattern of the conduits and if the ground is sloping, I may use a retarding construction such as Figs. 3 and 4 or Fig. 6. In order to develop a more even spread of the water I employ transverse spreading trenches 116. These are made by digging narrow ditches in the soil to a depth preferably slightly below that of the conduits, then packing peat moss indicated at 117 or other absorbent material in the bottom of the trench and then filling with the soil up to the ground level. This leaves what might be termed secondary conduits formed of the absorbent material only. As these secondary conduits receive water by percolation from the soil and the concrete irrigation pipes, this water spreads longitudinally and laterally from these secondary packings of peat moss or similar material, thus securing a more even distribution of the water and as the water recedes, the air and gas circulation is developed through the entrenched peat moss and the conduits.

In Fig. 8 I show a modified construction of the conduit in which case a pipe 120 preferably of galvanized sheet metal forms the core and has a socket end 121, there being similar sockets at opposite ends of the pipe length. Such pipe is provided with a plurality of longitudinal slots 122 in the bottom and in the molding procedure tapered or wedge shaped wood mold blocks 123 are inserted to extend through such slots. The concrete 124 is then poured and molded around the pipe, the sockets and the plugs and when this is set to a sufficient degree, the plugs are removed thus forming tapered openings in the bottom similar to the discharge openings 20 illustrated in cross section in Fig. 2. When using a pipe of this type it is not necessary to reinforce the concrete with metal or the like. The sockets are of such design that the wood spigots 36 may fit and form the joint between individual conduit lengths.

Various changes may be made in the details of the construction without departing from the spirit or scope of the invention as defined by the appended claim.

I claim:

A conduit for use in sub-irrigation comprising a relatively thick walled conduit having openings in its under side, the sides of which diverge outwardly, peat moss disposed in and filling said openings, and means for retaining the peat moss in the openings, comprising inwardly projecting fins formed integrally with the conduit projecting inwardly at the outer edges of the openings.

ALEXANDER RUSSELL BLACK.